UNITED STATES PATENT OFFICE.

THOMAS M. SANDERLIN, OF NORFOLK, VIRGINIA.

PAINT.

SPECIFICATION forming part of Letters Patent No. 455,118, dated June 30, 1891.

Application filed February 11, 1891. Serial No. 381,079. (No specimens.)

*To all whom it may concern:*

Be it known that I, THOMAS M. SANDERLIN, of Norfolk, in the county of Norfolk and State of Virginia, have invented certain new and useful Improvements in Paints; and I do hereby declare that the following is a full, clear, and exact description thereof.

My invention is an improvement in waterproof paints for roofing and other purposes, and its object is to produce a substantial durable roofing-paint; and it consists in the novel preparation and combination of ingredients hereinafter specified.

I put a quantity of lime unslaked, or air-slaked only, into a barrel or other vessel, fill the vessel with water, and leave it until the water has become a saturated solution of lime. Then I take one part of this lime-water and mix it with two parts of linseed-oil, forming an emulsion thereof. I can color this with any suitable pigment.

To make a cheap and heavy-bodied roofing-paint, I take ten pounds of the Spanish brown or metallic brown rich in ferric oxide, two pounds of yellow ochre, one-quarter pound of burnt umber, and two pounds of hydraulic cement, and mix the same with a sufficient quantity of the emulsion to bring the mass to the fluid consistency of ordinary paint. This gives a brown-colored paint, very durable, heavy, and water-proof. These proportions of ingredients are substantially maintained whether the amount of paint to be made is much or little.

Having described my invention, what I claim as new, and desire to secure by Letters Patent thereon, is—

The herein-described roofing-paint, consisting of a paint-body rich in ferric oxide, a drier, a coloring substance, hydraulic cement, and an emulsion of lime-water and linseed-oil, substantially as set forth.

In testimony that I claim the foregoing as my own I affix my signature in presence of two witnesses.

THOMAS M. SANDERLIN.

Witnesses:
 AARON PEIRCE,
 JAS. A. WILSON.